(No Model.)
V. STEIN.
WORK GUIDE FOR SAWS.
No. 500,972. Patented July 4, 1893.
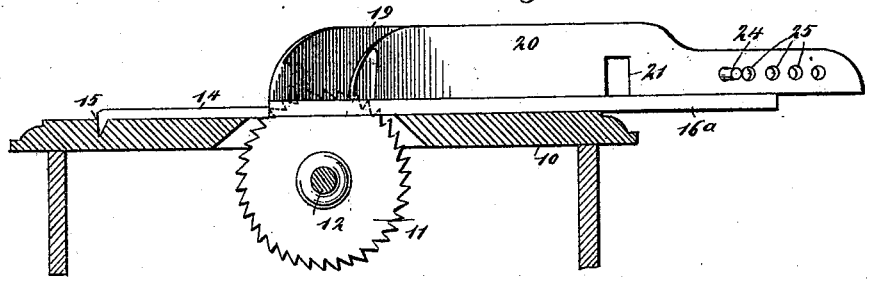
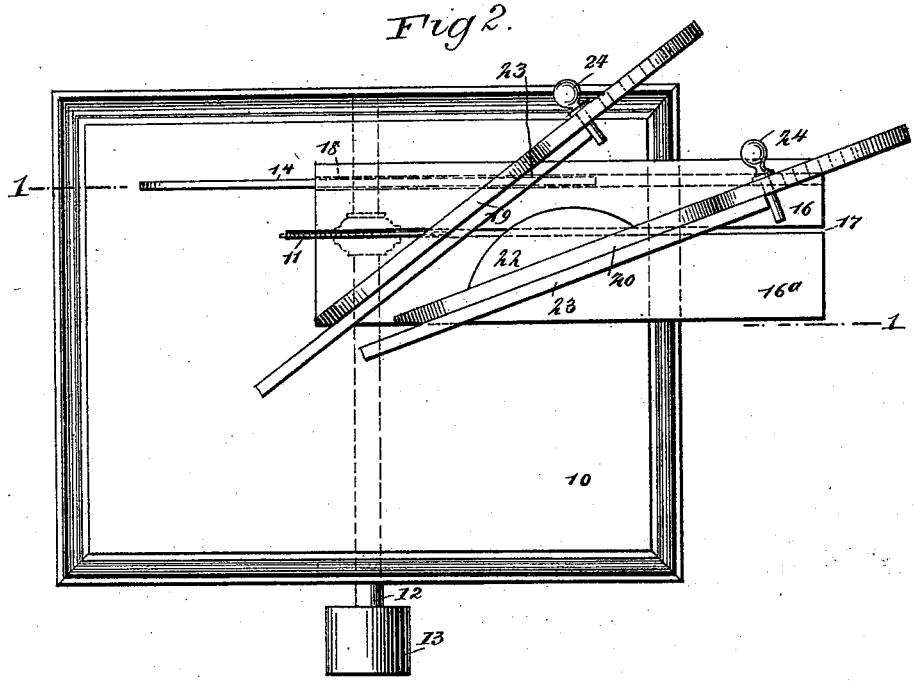
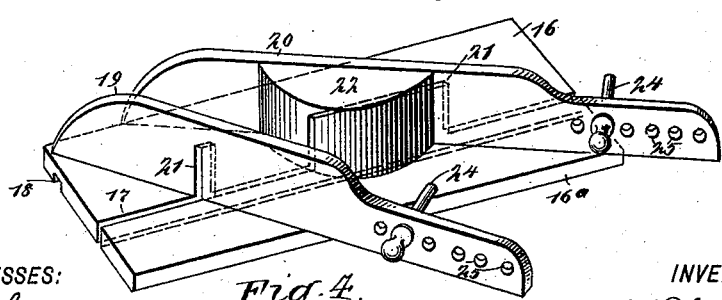
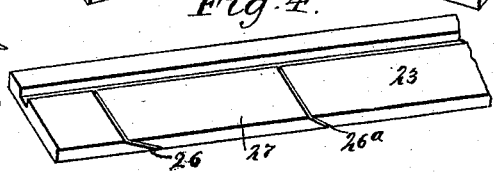
WITNESSES:
Paul Johol
C. Sedgwick
INVENTOR
V. Stein
BY Munn & Co
ATTORNEYS.

UNITED STATES PATENT OFFICE.

VALENTINE STEIN, OF NEW YORK, N. Y.

WORK-GUIDE FOR SAWS.

SPECIFICATION forming part of Letters Patent No. 500,972, dated July 4, 1893.

Application filed March 25, 1893. Serial No. 467,615. (No model.)

*To all whom it may concern:*

Be it known that I, VALENTINE STEIN, of New York city, in the county and State of New York, have invented a new and Improved Work-Guide for Saws, of which the following is a full, clear, and exact description.

My invention relates to improvements in that class of guides which are adapted to hold material to be sawed and guide it properly to the saw, and the object of my invention is to produce a guide which is applicable to any common form of saw table, and which enables the pockets to be quickly and accurately made in the stiles of windows.

It is well known that the pockets in window stiles, which are made to facilitate the insertion and removal of sash weights, are formed by cutting out a section of the stile, and to insure the secure fastening of this section in place after the sash weight has been inserted, it is necessary that the two ends of the section be cut at different angles. My invention is intended to provide a guide by means of which the two angles on the stiles may be quickly cut, and also to adapt the guide for cutting the pockets in opposite stiles; that is, the guides are made rights and lefts.

To these ends my invention consists in certain features of construction and combinations of parts, which will be described hereinafter and pointed out in the claims.

Reference is to be had to the accompanying drawings forming a part of this specification, in which similar figures of reference indicate corresponding parts in all the views.

Figure 1 is a cross section of a saw table with one of my guides in place thereon, the section being taken on the line 1—1 in Fig. 2. Fig. 2 is a plan view of the same. Fig. 3 is a detail perspective view of a left hand guide, and Fig. 4 is a broken detail view of one of the sash stiles, showing the usual angular cuts therein.

The saw bench or table 10 may be of any kind whatever, and it is provided with the usual saw 11, which turns in a slot in the bench top, and which is carried by the mandrel 12, this being driven by a pulley 13 in the usual way. On the bench top, at a little distance from and parallel with the plane of the saw, is a guide rail 14, which is removable, and which has depending ends 15 adapted to enter sockets in the bench top, or the guide rail may be fastened in any other convenient way.

The guide proper comprises two parallel slide plates 16 and 16ª, which are adapted to move over the bench top and which are separated by a slot 17, through which the saw 11 passes. The plate 16 is provided with a longitudinal groove 18, which fits the guide rail 14, so that when the groove is placed over the rail and the guide pushed across the table top, the saw 11 will register accurately with the slot 17.

The saw plates 16 and 16ª are provided with vertical wings 19 and 20, which extend diagonally across the plates at an angle to the slot 17, and which are arranged at different angles and placed one behind the other. The wings 19 and 20 are slotted vertically, as shown at 21, these slots registering with the slots 17, so as to permit the saw to pass through them. The front wing 20 is also provided with a guard 22, to prevent the sawyer from getting his hands in contact with the saw, and the guard is also slotted to receive the saw. The wings are adapted to support the stiles 23, which are held against the faces of the wings and parallel with the wings, and to enable the stiles to be properly adjusted so that they may be cut through in the right places, pins 24 are used, which extend transversely through the wings near their outer ends, and form abutments for the ends of the stiles. The wings are provided with longitudinal series of holes 25, adapted to receive the pins, so that the pins may be nicely adjusted.

When the stiles are to be sawed, one is placed against the wing 20 and pin 24, and the saw guide is then pushed forward causing the saw to cut one end of the pocket, after which the stile is placed against the wing 19, and the guide again pushed forward cutting the second end of the pocket.

It will be observed that as the wings 19 and 20 are at different angles, the saw will cut through the stiles at different angles, and as one cut is made with the stile against one wing and the other with the same stile against the opposite wing, the cuts will be made at different angles in the stile, and are very rapidly and accurately formed.

As shown in Figs. 1 and 2, the wings extend to the right of the saw, thus adapting the guide for use in sawing stiles for one side of a window, and as shown in Fig. 3, the wings extend to the left, thus adapting the guide for use on stiles for the opposite side of the window.

Having thus described my invention, I claim as new and desire to secure by Letters Patent—

1. The combination, with the circular saw, of a guide held to move over the saw, the guide being provided with a longitudinal slot to receive the saw, and with diverging wings extending across it and slotted also to receive the saw, substantially as specified.

2. The combination, with the circular saw, of the guide held to move over the saw and provided with a slot to receive the saw, wings placed diagonally and at different angles on the guide, the wings being slotted to receive the saw, and adjustable abutments carried by the wings and adapted to fit against the ends of the stiles which are sawed, substantially as specified.

3. The combination, with the saw and bench, of a guide rail secured to the bench parallel with the plane of the saw, a guide having a groove to fit the rail and a slot to receive the saw, and wings placed diagonally on the guide and provided with slots for the saw, substantially as specified.

4. As an improved article of manufacture, a work guide for saws comprising a longitudinally-slotted base, wings extending diagonally across the base, and at different angles, the wings having slots which register with the longitudinal slot and a plurality of holes in their outer ends, and abutment pins for the holes in the wings, substantially as specified.

VALENTINE STEIN.

Witnesses:
WARREN B. HUTCHINSON,
F. W. HANAFORD.